United States Patent [19]

Erbach et al.

[11] 4,032,743
[45] June 28, 1977

[54] LASER MICROPERFORATOR

[75] Inventors: Arthur R. Erbach, Des Plaines; Allen R. Franck, Glen Ellyn; Dennis L. Mulee; Wilhelm E. Schmitt, both of Schaumburg, all of Ill.

[73] Assignee: Marvel Engineering Company, Chicago, Ill.

[22] Filed: June 27, 1975

[21] Appl. No.: 590,868

[52] U.S. Cl. .................. 219/121 LM; 219/384; 346/76 L

[51] Int. Cl.² .................................. B23K 26/00

[58] Field of Search ... 219/121 LM, 121 L, 121 EM, 219/121 EB, 69 M, 69 R, 384, 229, 244; 178/6.6 R, 6.6 B, 6.6 TP, 6.6 DD, 6.6 P; 346/76 L; 331/94.5 R, DIG. 1

[56] References Cited

UNITED STATES PATENTS

| | | | |
|---|---|---|---|
| 3,226,527 | 12/1965 | Harding | 219/121 L X |
| 3,265,855 | 8/1966 | Norton | 219/121 LM |
| 3,325,819 | 6/1967 | Fraser | 346/76 |
| 3,371,190 | 2/1968 | Meyer | 219/121 LM X |
| 3,404,254 | 10/1968 | Jones | 219/121 LM X |
| 3,614,369 | 10/1971 | Medkey | 219/121 LM X |
| 3,622,742 | 11/1971 | Cohen et al. | 219/121 L |
| 3,636,251 | 1/1972 | Daly et al. | 178/6.6 B |
| 3,656,988 | 4/1972 | Steffen et al. | 219/121 LM X |
| 3,769,488 | 10/1973 | Hasslinger | 219/121 LM |

Primary Examiner—J. V. Truhe
Assistant Examiner—Mark Paschall
Attorney, Agent, or Firm—Kinzer, Plyer, Dorn & McEachran

[57] ABSTRACT

A method and apparatus for forming rows and columns of closely spaced micron sized holes in a thin foil, including a cylindrical member and means for rotating it. There are means for mounting a plurality of axially extending foil strips on the cylindrical member and means for moving said foil strips axially of the cylinder. There are a plurality of stationary lasers uniformly positioned in a single plane about the periphery of said cylindrical member and means for correlating movement of said cylindrical member, axial movement of the foil strips and the firing of said lasers so as to form holes as described in closely spaced rows and columns.

17 Claims, 7 Drawing Figures

LASER MICROPERFORATOR

SUMMARY OF THE INVENTION

Filter media for the small micron diameter range of filtration can be constructed from foil as thin as two or three mils if the media is backed by a relatively coarse screen to provide strength to resist the pressure differential that may occur across the medium during its application. The supporting wire screen can be spot welded or otherwise attached to one side of the perforated medium while it is in the flat condition. The assembly is then fluted, formed into a generally circular configuration, and inserted into a canister having inlet and outlet ports suitable to the application intended. Use of relatively thin foil for this purpose can result in significant reduction in cost, especially if the filter medium is required to be stainless steel, titanium alloys, or other exotic material.

For reliable filtration, the medium must exclude all particles above the size specified. That is to say, for example, a 10 micron filter would be expected to exclude all particles having any dimension greater than 10 microns. This of course implies that the holes in the filter medium have a diameter of 10 microns. It is also desirable that the filter medium possess the highest percentage of "openness" possible. This again implies that circular holes be "nested" as shown herein.

The technique of the present invention provides a mechanism to move the foil to be perforated across the path of a laser beam in such a manner that (1) the instantaneous velocity of the foil movement has little or no effect on the center-to-center distance between adjacent holes in the same row; (2) minute errors in center-to-center distance between holes are well within the exceptionally small quantity that can be tolerated, and these errors are not cumulative; (3) machine mechanical drive speed is synchronized with laser beam turn-on and turn-off to allow the driver speed to be altered at will without affecting desired hole spacing; (4) several lasers can be utilized, preferably in even numbered multiples, in order to increase the rate of hole production; (5) holes in adjacent rows are automatically "nested" in order to approach the maximum percentage of openness, which appears to be on the order of 40%; (6) perforation of each hole is accomplished so swiftly that the foil material need not be brought to a stop while each hole is made; (7) suitable electronic logic circuitry permits changing the center-to-center distance between holes and the dimension between adjacent rows of holes by simple electronic adjustments; and (8) since the invention eliminates the need for intermittent motion by large masses, and since the inescapably large laser assemblies will be immovable, mechanical vibration, which contributes to errors in hole placement and circularity, is reduced to the vanishing point.

BACKGROUND OF THE INVENTION

This invention relates to an apparatus and method for creating exceptionally small holes primarily of the low micron or sub-micron diameter range, at very high rates of speed, typically on the order of 30,000 holes per second per laser used, in metallic or non-metallic foil or sheet, by means of pulsed laser energy, to provide an unusually high percentage of openness, typically on the order of 40%. For purposes of discussion and illustration herein, a pattern of 10 micron (0.00039 inch) diameter holes will be set forth, it being understood that the invention described is capable of accuracies required to create, at similar rates of speed, patterns of holes of much larger or much smaller size. Such microperforated foil finds ready and extensive application in a great many industrial and scientific circumstances, notably as filter media.

Since it is desirable that filer media offer a minimum impediment to fluid flow through the filter element, the hole pattern in the media should be spaced as closely as possible. For a pattern of 10 micron diameter holes, in order to achieve 40% openness, hole center-to-center distance must be 0.00058 inch, and holes in adjacent rows must be "nested" so that bridges between neighboring holes have a maximum width of 0.00019 inch and remain intact. It will be evident that hitherto conventional tooling and methods (such as punches and dies or electrical discharge) cannot create such hole patterns nor attain the requisite accuracy at high enough rates to be economically competitive with existing woven media. For example, the number of holes that must be placed per square foot in the 10 micron pattern cited is approximately 482 million. In a pattern of four micron diameter holes, a 40% open condition demands more than three billion holes per square foot. Therefore, any process of manufacture, to be economically feasible, must be capable of very high rates of hole production as well as a high degree of repetitive accuracy in hole placement. In the present invention as herein described, 30,000 holes per second per laser is an expected minimum production rate for 10 micron diameter holes; in the case of four micron diameter holes, it is 45,000 holes per second per laser. At such rates, these foil filter media can be manufactured at a fraction of existing costs, and with a significantly greater percentage of openness (about 40% vs. 33%).

The wavelength of the laser and the mode in which it oscillates control the minimum diameter to which the laser beam can be focused. The smallest spot diameter will be realized when the laser operates in the fundamental, i.e. $TEM_{00}$, mode, but in higher order modes available laser power is greater. It has been found that oscillation in the $TEM_{01}$ mode, in which significantly greater power is available, will still permit focusing laser energy of 1.06 microns wavelength to a 10 micron diameter, providing that a "beam expander" is included with the focusing optics. These facts may permit a rate of hole production greater than 30,000 per second, which figure is based on an 18 watt laser operating in fundamental mode.

There is wide latitude in the type of laser than can be used. Choice will depend on the size of holes desired, minimum energy needed per pulse, mode of oscillation used, repetition rate required. In the example of 10 micron diameter holes, a convenient wavelength of 1.06 microns can be obtained from a Nd:YAG or equivalent laser type. For holes much smaller than 10 microns, a laser of shorter wavelength would be chosen.

In order to create holes at the described rate of 30,000 per second, not only must the laser beam be switched on and off at that rate, but the relative position of the laser beam and the material being perforated must be changed to accomodate that rate while simultaneously maintaining the necessary locational accuracy required by the hole pattern. The use of a laser to create holes by means of focused laser radiation is common. However, no process to date is able to attain the accuracy of hole placement together with the continuous, very high rate of hole production required to equal or better the woven filter media in performance and cost.

BRIEF DESCRIPTION OF THE DRAWINGS

The invention is illustrated diagrammatically in the following drawings wherein.

DESCRIPTION OF THE PREFERRED EMBODIMENTS

Figure 1:
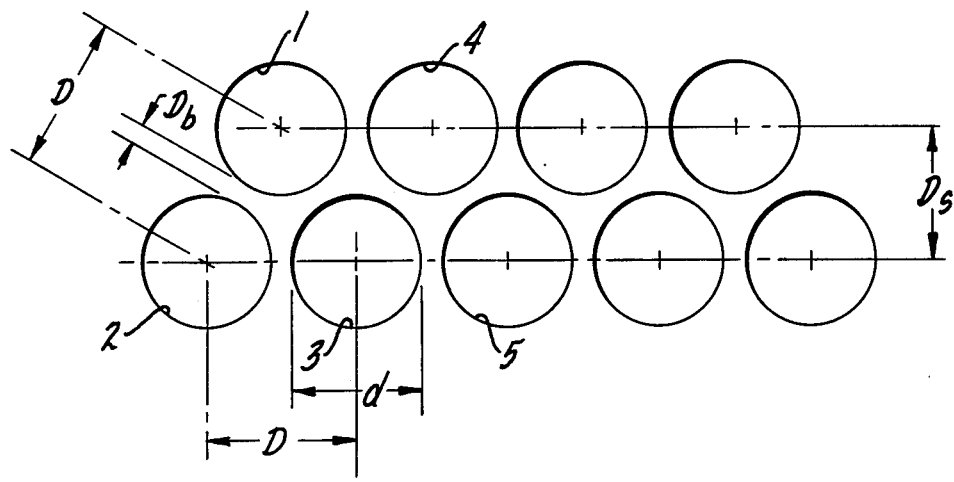
FIG. 1 shows a representative portion of the preferred hole pattern in the filter media, together with symbols denoting the various dimensions of the pattern.

FIG. 1 shows a representative portion of the pattern necessary to obtain maximum percentage of openness. Hole 1 is shown nested between holes 2 and 3; likewise hole 4 is nested between holes 3 and 5, and so forth. In FIG. 1, $d$ is the diameter of the holes, D is the center-to-center distance between any two holes, and $D_s$ is the altitude of the imaginary equilateral trianges formed by the hole centers and is therefore the distance between adjacent rows of staggered holes. Th formulas which relate these dimensions are:

$$P_o = 0.9069\ d^2\ D^2$$

and $$D_s = D\cos 30+,$$

where $P_o$ is the percentage of openness expressed as a decimal. In the example of 10 micron diameter holes, with $P_o$ set equal to 0.4, D will be found to be 0.000587 inch, and $D_s$ is determined to be 0.000508 inch. The symbol $D_b$ represents the width of the bridges between holes, whose integrity of course must be preserved. In the example given, $D_b$ will be found to be 0.000197 inch. By use of these two equations, the dimensions among nested holes for any given hole diameter and percentage of openness can be determined.

Figure 2:
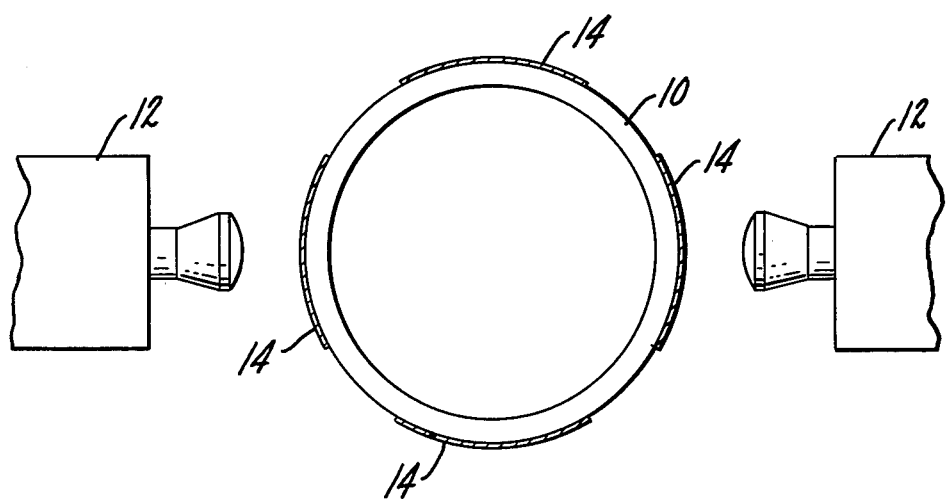
FIG. 2 is a diagrammatic illustration of the laser perforating apparatus.

In the diagrammatic illustration of FIG. 2 a rotatable cylindrical drum 10 rotates about a vertical axis. A plurality, for example four, equally spaced laser assemblies 12 are positioned about the periphery of drum 10 is the same plane so as to provide perforating pulses of energy at predetermined timed intervals. Strips of foil 14 will be moved parallel to the axis of drum 10 by assemblies to be described and will also be moved in the direction of drum rotation by the drum itself. When the foil strips 14 are positioned in front of the laser assemblies 12, they will be perforated as described.

Figure 3:
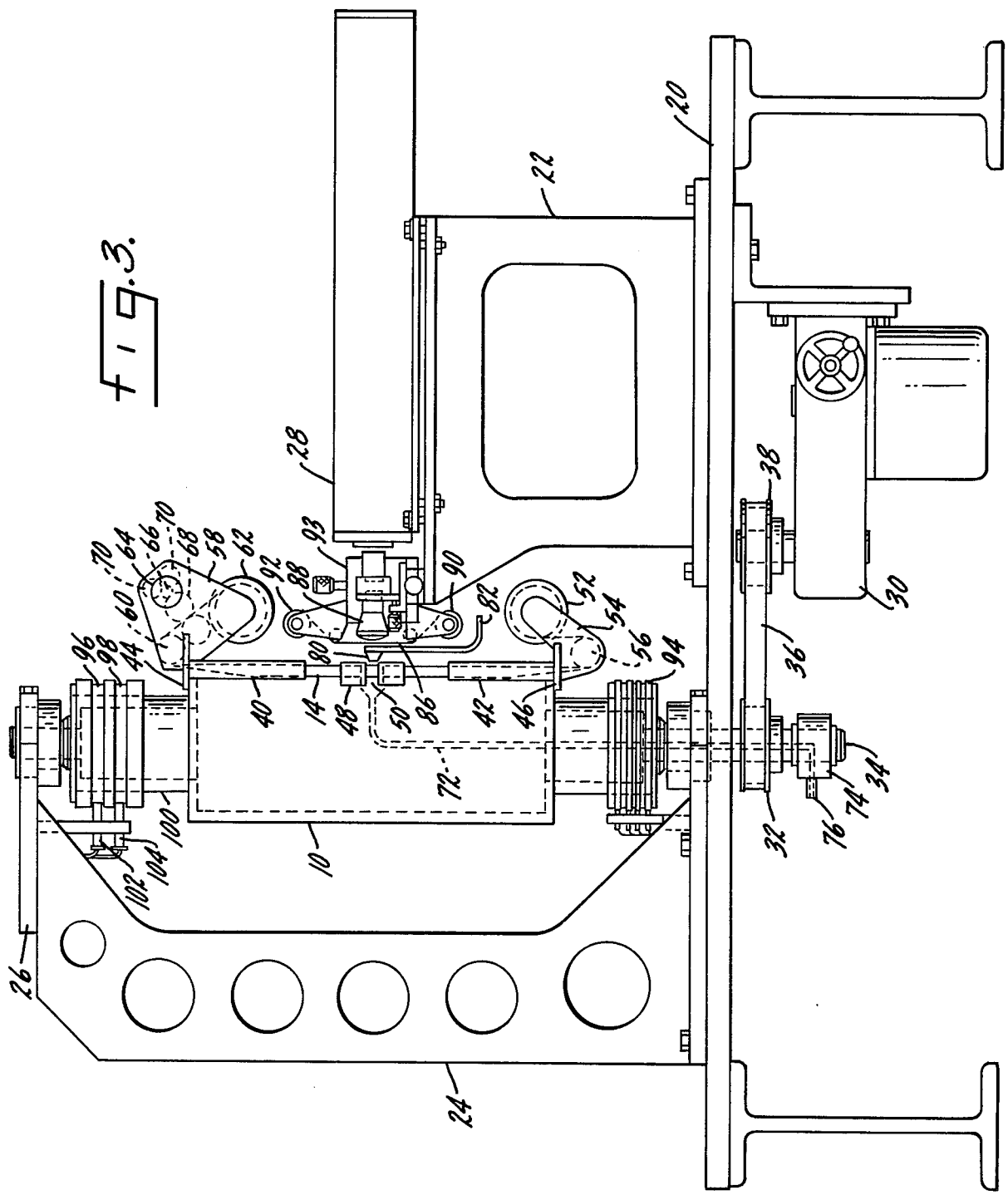
FIG. 3 is a side elevation of an apparatus showing the basic mechanical arrangement of elements embodying the present invention.

In the detailed illustration of FIG. 3, a support assembly 20 mounts a laser support 22 and a vertical drum support 24. Drum 10 is rotatably mounted in an extension 26 of vertical support 24 and in support 20. Laser assembly 28 is rigidly mounted on its support 22.

A variable speed reducer 30 is mounted on the underside of support 20 and drives a pulley 32 on drum shaft 34 through a gear belt 36 and a pulley 38 driven directly by the speed reducer. Thus, the speed reducer can provide any drum rotational speed desired as determined by the particular hole pattern. As will become clear from the control circuitry description hereinafter, hole spacing accuracy is unaffected by drive speed variation.

In th structure of FIG. 3, only one laser and foil strip have been illustrated. However, in the commercial application of the apparatus disclosed herein, there will be a plurality of lasers, as diagrammatically illustrated in FIG. 2.

It is important that the foil strips 14 closely conform to the periphery of drum 10 as it rotates and as the foil is perforated. Accordingly, upper and lower conformance guides 40 and 42 are mounted by brackets 44 and 46 to the drum 10. At the midpoint of the drum the foil strip 14 will pass through a precision guide plate 48 which is placed directly in front of the laser assembly 28 and has an intermediate gap 50 through which the laser beam passes in focusing on the foil.

The foil strips will be on reels so that the foil may be fed past the laser as the drum rotates. A supply reel 52 is mounted on a bracket 54 attached to drum 10. An idler roller 56 is also journalled in bracket 54. The supply of foil will pass upwardly along the drum periphery and the entire reel and foil assembly will rotate with the drum. At the top of the drum there is a bracket 58 which mounts an idler roller 60 and a take-up reel 62. Also located and mounted on bracket 58 is a stepping motor 64 whose drive shaft 66 will cause rotation of a foil drive 68 which causes the foil to be moved in the manner described. Smooth friction drives are preferred to conventional gear sets because even master quality gears have allowable tooth-to-tooth errors which would introduce undesirable uncertainties into the increments of foil movement needed to assure repeatedly accurate registration of rows of holes. In order to prevent deflection of the stepper motor shaft, which is of small diameter, and to increase transmission of torque, backup roll 70 will be spring loaded against the stepper motor shaft. The stepper motor drive will advance the foil after each row of holes has been finished, before the next row is begun by the next laser in turn. In each successive row of holes, the holes must be staggered relative to those in the preceding row. Suitable electronic circuitry will alter the timing of laser pulses during successive sweeps of the foil strips across the laser focusing lenses.

It is desirable to apply vacuum to the underside of the foil in the region of initial laser penetration to assist in removal of debris resulting from the rapid perforation. Vacuum will be supplied along conduit 72 through rotary union 74 and a tube attachment 76.

A small plenum 80 will be mounted about the point of laser focus and will be supplied with high pressure gas through a supply tube 82. Small holes in the end of the plenum will direct the gas at the focal point of the laser beam on the foil surface. Such a supply of gas will provide more rapid dispersal of the plume, thus minimizing laser energy absorption within the plume; assistance in forming the hole due to the gas pressure tending to blow the liquefied and vaporized material down through the hole; cooling of the perforated zone, thus helping to preserve the integrity of the bridges between holes; and bathing the region of perforation to prevent oxidation.

A strip of film 86, for example a Mylar film which is transparent to the wave length of the laser, is positioned between the foil and laser lens 88. The film will be moved at an appropriate fixed rate from supply and take-up reels 90 and 92. Relatively insignificant in cost, the film is sacrificed in order to protect th lens from being coated by the vaporized material and thus ruined.

Laser 28 will include focusing lens and beam expander optics indicated generally at 88, mounted on an adjustable stage 92, which is capable of precision adjustment along the axis of the laser beam and two other mutually perpendicular axes by means of micrometer threads. Such lasers are common in the art. By this means the laser beam can be focused to the desired spot diameter on the foil. As each foil passes a laser head, laser energy is turned on and off at precise instances by the circuitry to be described, each laser pulse forming a discrete hole in the foil. Since the laser pulse will endure for only approximately 0.3 microsecond, the hole formed will be essentially circular even though it is made "on the fly."

It is desirable to maintain a small amount of free foil in the form of a loop under lower roller 56 so that the stepper motor, when called upon to advance the foil upwardly, does not work against the rotational inertia of the entire lower supply reel 52. Although not shown, a small cam mechanism may be incorporated at the lower periphery of drum 10 so that at proper intervals during drum rotation while the stepper motors are inactive, each of the lower rollers 56 will be forced downward approximately 0.015 inch and then immediately returned under spring force. Thus, a small supply loop will be maintained and in this manner the dynamic load experienced by the stepper motors will be minimal.

Positioned near the lower end of drum 10 are a plurality of slip rings 94 which are used, along with their associated brushes, to provide current for operation of the stepper motors.

At the upper end of drum 10, two magnetic tape tracks 96 and 98 are locked into a small carrier cylinder 100 which is fixed to the drum's main shaft so that the surfaces of the magnetic tape tracks rotate concentrically with the shaft and at the same rotational angular velocity. Track 96 will carry magnetic data to command laser firing at proper intervals while the foil is in position to be perforated. Track 98 will be impressed magnetically with "inhibit" information so that the lasers are turned off during the intervals of drum rotation in which there is no foil passing the focusing lenses. Magnetic heads 102 and 104, similar to those on an ordinary tape recorder, are mounted in close proximity to the track. Each head will not only detect magnetic signals impressed on its respective track, but each will also be capable, on command, of erasing the tracks and re-recording new control data in the event hole diameter in the media is to be changed which would require alteration in hole center-to-center spacing and row spacing. Control of laser firing by this means enables a single machine to make a range of hole sizes within the limits of available laser energy, while maintaining the pattern in the desired percentage of openness.

The control system provides machine operation flexibility. For purposes of describing operation of the control circuitry, it should be assumed that the circumference of drum 10 is sufficient to accomodate from one to four foil strips and leave an appropriate spaced between strips. The foils may be of unequal width if desired. If all foils are to have identical patterns of holes, programming of the magnetic tracks is substantially simplified. However, by introducing additional electronic circitry, it is possible to alter the hole configuration and even hole diameter, although this may not be economical on adjacent foils.

Figure 4:
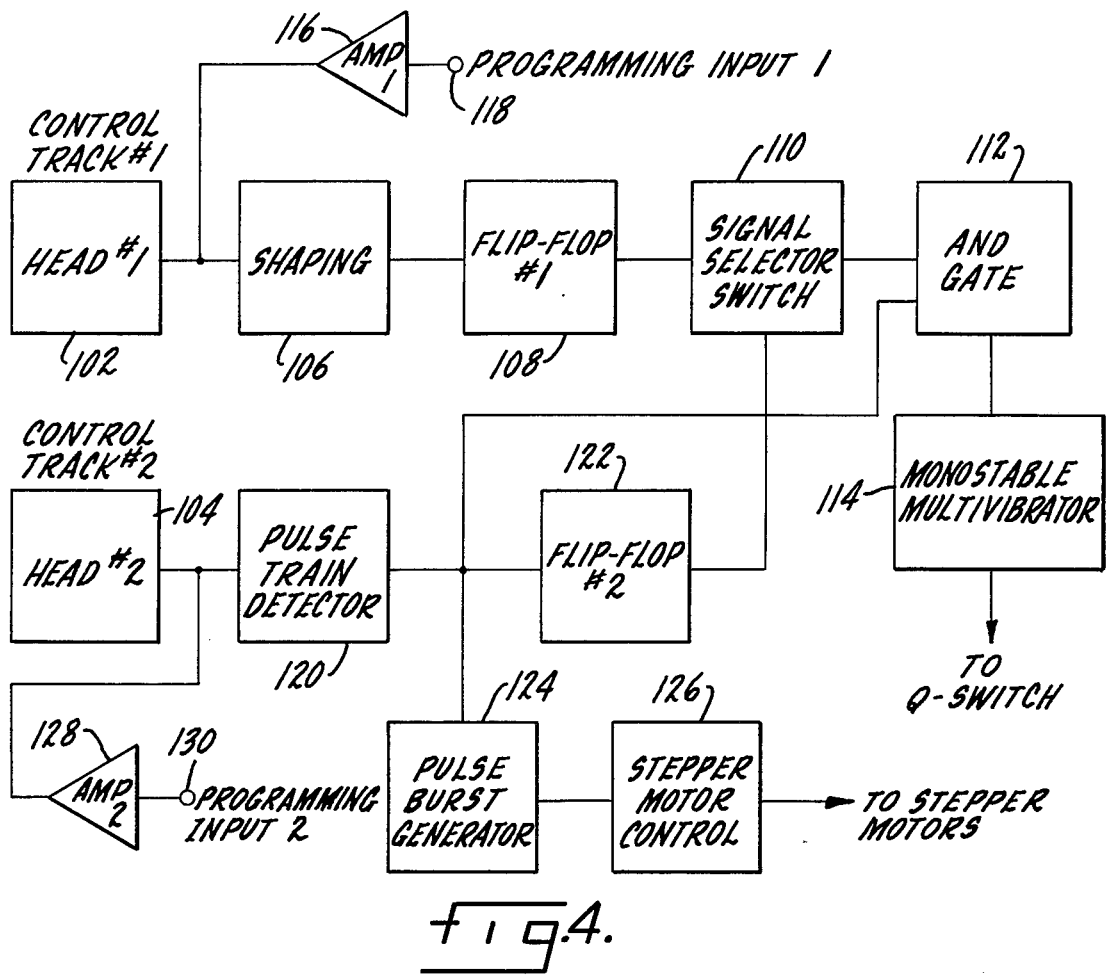
FIG. 4 is an electronic block diagram of the laser control circuitry.

In the circuitry of FIG. 4, detector head 102 is connected to a shaping circuit 106 which in turn is connected to a flip-flop 108. A signal selector switch 110 is connected between flip-flop 108 and AND gate 112. The AND gate 112 in turn is connected to a monostable multivibrator 114 which provides the necessary operational signal for the laser. An amplifier 116 is connected between programming input 118 and detector head 102 for use in changing the recorded program on control track 96.

Detector head 104 is connected to a pulse train detector 120 which in turn is connected to AND gate 112 and to a flip-flop 122. The output of flip-flop 122 is connected to signal selector switch 110. A pulse burst generator 124 receives an input from pulse train detector 120 and in turn provides an output for stepper motor control 126. An amplifier 128 is connected to a second programming input 130 for providing recording information for track 98.

Figure 5:
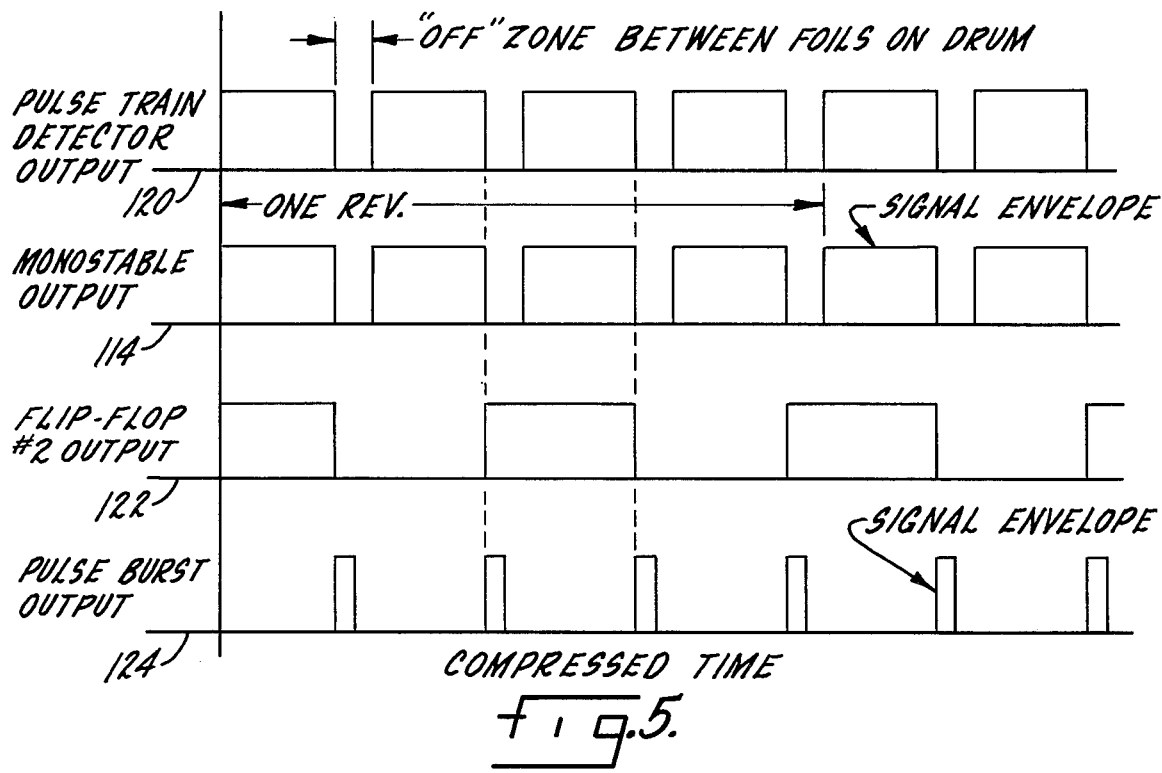
FIG. 5 is a signal timing diagram showing the envelopes of control signals in compressed time.
Figure 6:
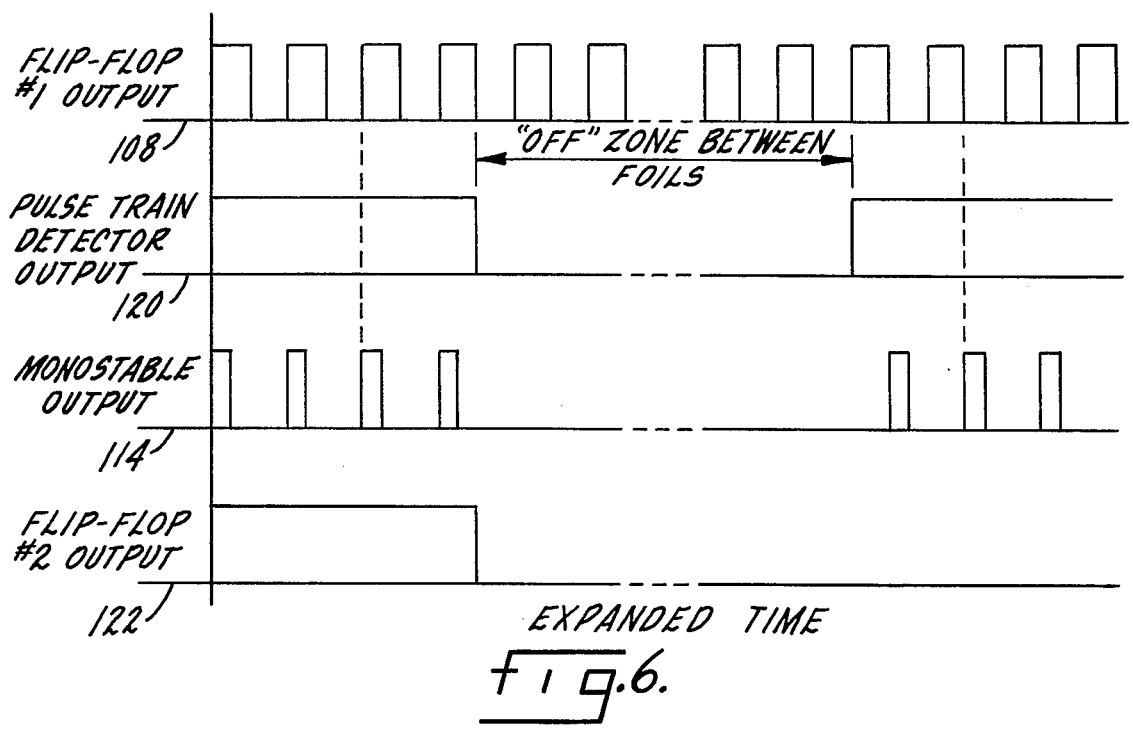
FIG. 6 shows certain control signals in expanded time so as to reveal component wave shape details within the signal envelopes.

Assuming four foil strips of equal width are equally spaced around drum 10, magnetic track 96 will be programmed with magnetic spots such that each angular interval through which the track must move in order to induce corresponding pulses in its associated read head equals the angular interval between hole centers on the surface of the foil. Note the top diagram on FIG. 5. Track 98 will be programmed so that the sequence of magnetic spots exists only over the angular interval occupied by the foil strips on the drum.

Four laser energy sources arranged at 90 degree intervals aimed along the diameter of the drum and all in the same plane and perpendicular to the drum axis will simultaneously emit a high energy pulse of coherent radiation when triggered by monostable multivibrator 114. This is accomplished by applying RF energy to an acousto-optical modulator situated within the laser cavity. The monostable multivibrator acting under control of pulses arriving from read head 102 switches on all four laser sources. As the trailing edges of the foils reach the point of laser focus, the pulse train disappears from track 98, note the top diagram of FIG. 5, causing the pulse train detector 120 output to go low and trigger three events. First, AND gate 112 turns off the monostable multivibrator, thereby disabling the laser during the off period or off zone. Second, flip-flop 122 changes state, and third, the pulse burst generator 120 is triggered, causing the stepper motors to advance all four strips into position for the next row of holes. As the end of the off zone is reached, and the leading edges of the foil strips come into position at the laser focus point, the pulse train reappears on track 98, causing the pulse train detector 120 to go high. This in turn enables AND gate 112 and the lasers begin firing again. However, flip-flop 108 is in the alternate state from that during the previous foil pass. This causes the signal selector switch 110 to pass the alternate or complementary signal from flip-flop 108, thus displacing the next row of holes so that they are nested between those of the previous rows.

Figure 7:
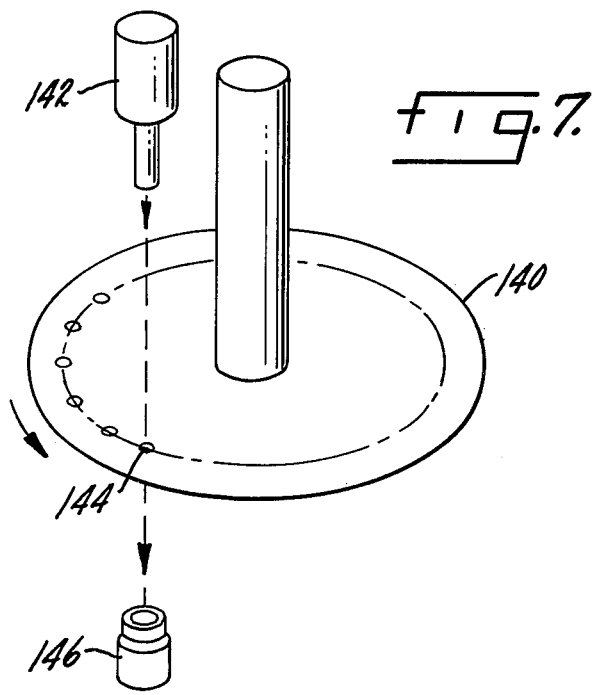
FIG. 7 shows an alternative method of generating pulses to control laser firing.

FIG. 7 depicts an alternate method of generating signals to control laser firing. A disc 140 containing a circularly oriented pattern of holes of uniform spacing is mounted on the main drum shaft so that the holes lie on a conveniently chosen radius relative to the shaft centerline or axis of rotation. The angular interval of the holes is chosen to equal that subtended by the holes to be placed in the foil strips. A highly collimated light source 142 is directed perpendicular to control disc 140 and in such a manner that each of holes 144 pass directly under the light beam. A photo-sensitive device, such as a photo diode 146, is mounted on the side of the disc opposite the light source, in a position to detect the interrupted beams of light from source 142 as the holes in disc 140 sequentially intercept the beam. Each of the light pulses reaching the photodiode results in a small voltage pulse, which can then be amplified and used to command laser firing to produce a hole in the foil strip. Inasmuch as the control disc is fixed to the same shaft on which the drum rotates, variations in drive speed to the drum again will not alter the intended hole spacing. In an identical manner, utilizing a second control disc, holes can be placed to provide inhibit information which turn off the lasers when the foil widths are out of the angular perforation zones. During this angular period, an absence of holes will cause the photo-diode to become quiescent, and this absence of signals is then used to accomplish the same three objectives mentioned earlier as a consequence of the disappearance of the pulse train from magnetic track 98. It is practical for one control disc to accomplish both laser firing control and inhibit control, simply by placing circular arrays of holes at different radii, but concentric to the shaft. Also, the number of holes used for laser control need not bear a 1:1 ratio with the holes to be perforated, since multiply or divide circuits could be used to accomodate any ratio desired.

An important objective of this control system is to provide full synchronizatin between electrical and mechanical elements of the machine so that hole spacing and row spacing will be invariant under machine drive speed changes or perturbations. The system is easily adapted to produce different hole spacing by re-programming track 96; different row spacing is accomplished by re-programming the pulse burst generator. The number of foil strips can be varied within the dimensional capacity of the drum used, and various foil widths can be accomodated by re-programming the inhibit intervals in the pulse train on track 98.

An important feature of the invention which ensures non-cumulative errors and repetitively accurate spacing or rows of holes is the use of harmonic drive stepper motors to advance the foil strips during angular intervals while the foil strips are moving between lasers. The guaranteed accuracy of these stepper motors is ±5 minutes of arc, and is non-cumulative due to their direct harmonic drive design. The possible angular error in the final foil drive rolls will be reduced to ±5% of the stepper motor tolerance, or ±15 seconds of arc, due to the speed reduction between stepper motor and final drive rolls.

Whereas the preferred form of the invention has been shown and described herein, it should be realized that there may be many modifications, substitutions and alterations thereto.

The embodiments of the invention in which an exclusive property or privilege is claimed are defined as follows:

1. A method of forming rows and columns of closely spaced micron sized holes in thin foil strips including the steps of:
   positioning a plurality of foil strips in lengthwise in a direction parallel to the axis of and along the periphery of a continuously rotating generally cylindrical member,
   intermittently activating a plurality of stationary lasers positioned adjacent said cylindrical member as it and the foil strips rotate,
   periodically moving the foil strips in a direction parallel to the cylindrical member axis between periods that the lasers are active to effect the formation of holes in said foil strips.

2. The method of claim 3 further characterized in that said foil strips are moved in an axial direction, as the drum rotates, and during periods in which there are no foil strips opposite said lasers.

3. The method of claim 2 further characterized by and including the step of conforming said foil strips to the cylindrical member surface.

4. The method of claim 2 further characterized by and including the step of correlating laser activation with the speed of the drum so that the holes are formed with precise spacing.

5. The method of claim 4 further characterized in that said correlation step includes the step of sensing the position of the rotating cylindrical member and using said sensed position to activate firing of the lasers.

6. The method of claim 5 further characterized by and including magnetically sensing the angular position of the drum as it rotates.

7. The method of claim 1 further characterized by and including the step of directing high pressure gas generally at the point of focus of said laser beams to cool the foil in the region of laser perforation.

8. The method of claim 1 further characterized by and including the step of providing a film, transparent to the laser wave length, between the laser and the foil to protect the laser from being coated with vaporized material.

9. An apparatus for forming rows and columns of closely spaced micron sized holes including a cylindrical member and means for rotating it, means for mounting a plurality of foil strips on said cylindrical member, extending parallel to the axis of said cylindrical member, means for moving said foil strips in a direction parallel to the cylindrical member axis, a plurality of stationary lasers uniformly positioned about said cylindrical member, and means for correlating rotation of said cylindrical member, movement of said foil strips along the axial direction of said cylindrical member and activation of said lasers.

10. The structure of claim 9 further characterized by and including foil supply means and foil take-up means mounted on said cylindrical member, there being such means for each foil strip, the means for moving said foil strips including a stepping motor associated with each of said take-up means.

11. The structure of claim 9 further characterized in that each of said lasers is in the same plane relative to the axis of said cylindrical member.

12. The structure of claim 9 further characterized by and including means on said cylindrical member and rotatable therewith for use in determining the angular position of said cylindrical member as it rotates.

13. The structure of claim 12 further characterized in that said means for determining angular position includes at least one magnetically recorded track on said cylindrical member, and a stationary detecting head positioned adjacent said track.

14. The structure of claim 12 further characterized in that the means for determining angular position of said cylindrical member as it rotates includes a disc having a plurality of openings with controlled spacing, a source of radiation on one side of said disc and detecting means on the opposite side.

15. The structure of claim 9 further characterized in that said means for correlating movement of said cylindrical member provides for axial movement of said foil strips during rotation of said cylindrical member and when there are no foil strips positioned opposite said lasers.

16. The structure of claim 9 further characterized by and including means for conforming said foil strips to the outer periphery of said cylindrical member.

17. The structure of claim 9 further characterized by and including means for providing high pressure gas at the point of focus of each of said lasers on the foil.

* * * * *